United States Patent
Landry et al.

(10) Patent No.: US 12,462,499 B2
(45) Date of Patent: Nov. 4, 2025

(54) AUGMENTED REALITY DOOR OPENING WARNING

(71) Applicant: GM Global Technology Operations LLC, Detroit, MI (US)

(72) Inventors: Steven Landry, Royal Oak, MI (US); Joseph F. Szczerba, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

(21) Appl. No.: 18/479,444

(22) Filed: Oct. 2, 2023

(65) Prior Publication Data

US 2025/0111620 A1    Apr. 3, 2025

(51) Int. Cl.
| | |
|---|---|
| *G06T 19/00* | (2011.01) |
| *B60R 21/01* | (2006.01) |
| *B60R 21/015* | (2006.01) |
| *G06V 10/764* | (2022.01) |
| *G06V 20/58* | (2022.01) |

(52) U.S. Cl.
CPC .......... *G06T 19/006* (2013.01); *B60R 21/015* (2013.01); *G06V 10/764* (2022.01); *G06V 20/58* (2022.01); *B60R 2021/01013* (2013.01); *G06V 2201/07* (2022.01)

(58) Field of Classification Search
CPC .............. G06T 19/006; B60R 21/015; B60R 2021/01013; G06V 10/764; G06V 20/58; G06V 2201/07
See application file for complete search history.

(56) References Cited

U.S. PATENT DOCUMENTS

| | | | | |
|---|---|---|---|---|
| 2019/0259284 | A1* | 8/2019 | Khadloya | G06V 10/25 |
| 2020/0369264 | A1* | 11/2020 | Cheon | B60W 30/0953 |
| 2024/0331315 | A1* | 10/2024 | Heyl | G02B 27/0172 |

FOREIGN PATENT DOCUMENTS

| | | | | |
|---|---|---|---|---|
| CN | 111462488 A | * | 7/2020 | G06K 9/00771 |
| DE | 102019133976 A1 | | 6/2021 | |
| DE | 102021207842 A1 | | 3/2022 | |

(Continued)

OTHER PUBLICATIONS

English machine translation from EPO of foreign reference, Spiske DE 102020213673 A1 (Year: 2022).*

(Continued)

*Primary Examiner* — Daniel F Hajnik
(74) *Attorney, Agent, or Firm* — Vivacqua Crane, PLLC

(57) ABSTRACT

A system for providing warning to an occupant within a vehicle prior to the occupant exiting the vehicle includes a plurality of onboard sensors adapted to collect information related to an environment outside the vehicle, an occupant monitoring system adapted to monitor and detect movement of the occupant within the vehicle, a display screen adapted to be viewed by the occupant within the vehicle, a system controller adapted to detect when the occupant within the vehicle is about to exit the vehicle, detect a position of the occupant within the vehicle, display, on the display screen, a view of an environment outside of the vehicle, determine if there is a hazardous object within the environment outside of the vehicle, and classify the hazardous object, and provide augmented reality alerts within the display screen.

3 Claims, 4 Drawing Sheets

(56) References Cited

FOREIGN PATENT DOCUMENTS

| | | |
|---|---|---|
| DE | 102020213673 A1 | 5/2022 |
| DE | 102023108328 A1 | 10/2023 |
| DE | 102022133450 A1 | 6/2024 |

OTHER PUBLICATIONS

English machine translation from EPO of foreign reference, Weber et al. DE 102019133976 A1 (Year: 2021).*

* cited by examiner

AUGMENTED REALITY DOOR OPENING WARNING

INTRODUCTION

The present disclosure relates to a system and method for providing warnings of hazards when an occupant within a vehicle is exiting the vehicle.

Vehicles are equipped with many sensors to monitor the environment surrounding the vehicle, and to provide warnings when objects get to close, etc. Vehicles are also equipped with mirrors to allow an occupant within the vehicle to see objects in proximity to the vehicle that may be approaching the vehicle. Current sensor systems and mirrors are not adapted to actively monitor the environment surrounding a vehicle for objects and hazards which may cause harm to an occupant exiting a vehicle. This is particularly problematic for rear seat passengers who generally do not have exterior mirrors to help them see the environment surrounding the vehicle prior to exiting the vehicle.

Thus, while current systems and methods achieve their intended purpose, there is a need for a new and improved system and method for providing warnings to an occupant within a vehicle of hazards detected nearby prior to the occupant exiting the vehicle.

SUMMARY

According to several aspects of the present disclosure, a method of providing warning to an occupant within a vehicle prior to the occupant exiting the vehicle includes detecting, with a system controller in communication with a plurality of onboard sensors and an occupant monitoring system, when an occupant within the vehicle is about to exit the vehicle, detecting, with the system controller, a position of the occupant within the vehicle, displaying, with the system controller, on a display screen adapted to be viewed by the occupant, a view of an environment outside of the vehicle, determining, with the system controller, if there is a hazardous object within the environment outside of the vehicle, when there is a hazardous object within the environment outside the vehicle, classifying the hazardous object, and providing augmented reality alerts within the display screen.

According to another aspect, the method further includes determining, with the system controller, if a door of the vehicle has been opened, when the vehicle door has been opened, determining, with the system controller if additional alerts are necessary, if additional alerts are necessary, initiating, with the system controller, additional alerts.

According to another aspect, the detecting, with the system controller in communication with the plurality of onboard sensors and the occupant monitoring system, when the occupant within the vehicle is about to exit the vehicle further includes determining, with the system controller, if the vehicle is at least one of: stopped, parked and not-running, determining, with the system controller, via the occupant monitoring system, if the occupant is reaching for a door latch within the vehicle, and actuating, with the system controller, external cameras on the vehicle and capturing, with the external cameras, images of the environment outside the vehicle when at least one of the vehicle is at least one of stopped, parked and not-running, and the occupant is reaching for the door latch within the vehicle.

According to another aspect, the displaying, with the system controller, on a display screen adapted to be viewed by the occupant, a view of an environment outside of the vehicle further includes at least one of displaying, with the system controller, on a dedicated display screen mounted onto the door of the vehicle, the view of the environment outside the vehicle, and displaying, with the system controller, on a display screen of an onboard infotainment system, the view of the environment outside the vehicle.

According to another aspect, the determining, with the system controller, if there is a hazardous object within the environment outside of the vehicle further includes detecting, with the system controller and the plurality of onboard sensors, at least one moving object within the environment outside the vehicle.

According to another aspect, the detecting, with the system controller and the plurality of onboard sensors, at least one moving object within the environment outside the vehicle further includes analyzing the speed, position, acceleration, trajectory and recent changes to any of the speed, position, acceleration and trajectory of the at least one moving object relative to the vehicle.

According to another aspect, the determining, with the system controller, if there is a hazardous object within the environment outside of the vehicle further includes detecting, with the system controller and the plurality of onboard sensors, at least one stepping hazard within the environment outside the vehicle.

According to another aspect, the determining, with the system controller, if there is a hazardous object within the environment outside of the vehicle further includes determining, with the system controller, a probability that the at least one moving object will collide with at least one of the door of the vehicle and the occupant during the occupant's exit from the vehicle, and determining, with the system controller, a probability that the at least one stepping hazard will cause the occupant to at least one of trip, stumble and fall during the occupant's exit from the vehicle.

According to another aspect, the determining, with the system controller, a probability that the at least one moving object will collide with at least one of the door of the vehicle and the occupant during the occupant's exit from the vehicle, and the determining, with the system controller, a probability that the at least one stepping hazard will cause the occupant to at least one of trip, stumble and fall further includes probabilistically calculating, with a machine learning algorithm, a probability that the at least one moving object will collide with at least one of the door of the vehicle and the occupant during the occupant's exit from the vehicle, and a probability that the at least one stepping hazard will cause the occupant to at least one of trip, stumble and fall during the occupant's exit from the vehicle.

According to several aspects of the present disclosure, a system for providing warning to an occupant within a vehicle prior to the occupant exiting the vehicle includes a plurality of onboard sensors adapted to collect information related to an environment outside the vehicle, an occupant monitoring system adapted to monitor and detect movement of the occupant within the vehicle, a display screen adapted to be viewed by the occupant within the vehicle, a system controller in communication with the plurality of onboard sensors, the occupant monitoring system and the display screen, the system controller adapted to detect when the occupant within the vehicle is about to exit the vehicle, detect a position of the occupant within the vehicle, display, on the display screen, a view of an environment outside of the vehicle collected by at least one of the plurality of sensors, determine if there is a hazardous object within the environment outside of the vehicle, and when there is a hazardous object within the environment outside the vehicle, classify the hazardous object, and provide augmented reality alerts within the display screen.

According to another aspect, the system controller is further adapted to determine if a door of the vehicle has been opened, and when the vehicle door has been opened, determine if additional alerts are necessary, and, when additional alerts are necessary, initiate additional alerts.

According to another aspect, when detecting if the occupant within the vehicle is about to exit the vehicle the system controller is further adapted to determine if the vehicle is at least one of: stopped, parked and not-running, determine, via the occupant monitoring system, if the occupant is reaching for a door latch within the vehicle, and actuate external cameras on the vehicle and capturing, with the external cameras, images of the environment outside the vehicle when at least one of the vehicle is at least one of stopped, parked and not-running, and the occupant is reaching for the door latch within the vehicle.

According to another aspect, when displaying a view of an environment outside of the vehicle on the display screen, the system controller is further adapted to at least one of display on a dedicated display screen mounted onto the door of the vehicle, the view of the environment outside the vehicle, and display on a display screen of an onboard infotainment system, the view of the environment outside the vehicle.

According to another aspect, when determining if there is a hazardous object within the environment outside of the vehicle the system controller is further adapted to detect at least one moving object within the environment outside the vehicle.

According to another aspect, when detecting at least one moving object within the environment outside the vehicle the system controller is further adapted to analyze the speed, position, acceleration, trajectory and recent changes to any of the speed, position, acceleration and trajectory of the at least one moving object relative to the vehicle.

According to another aspect, when determining if there is a hazardous object within the environment outside of the vehicle the system controller is further adapted to detect at least one stepping hazard within the environment outside the vehicle.

According to another aspect, when determining if there is a hazardous object within the environment outside of the vehicle the system controller is further adapted to determine a probability that the at least one moving object will collide with at least one of the door of the vehicle and the occupant during the occupant's exit from the vehicle, and determine a probability that the at least one stepping hazard will cause the occupant to at least one of trip, stumble and fall during the occupant's exit from the vehicle.

According to another aspect, when determining a probability that the at least one moving object will collide with at least one of the door of the vehicle and the occupant during the occupant's exit from the vehicle, and when determining a probability that the at least one stepping hazard will cause the occupant to at least one of trip, stumble and fall the system controller is further adapted to probabilistically calculate, with a machine learning algorithm, a probability that the at least one moving object will collide with at least one of the door of the vehicle and the occupant during the occupant's exit from the vehicle, and a probability that the at least one stepping hazard will cause the occupant to at least one of trip, stumble and fall during the occupant's exit from the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
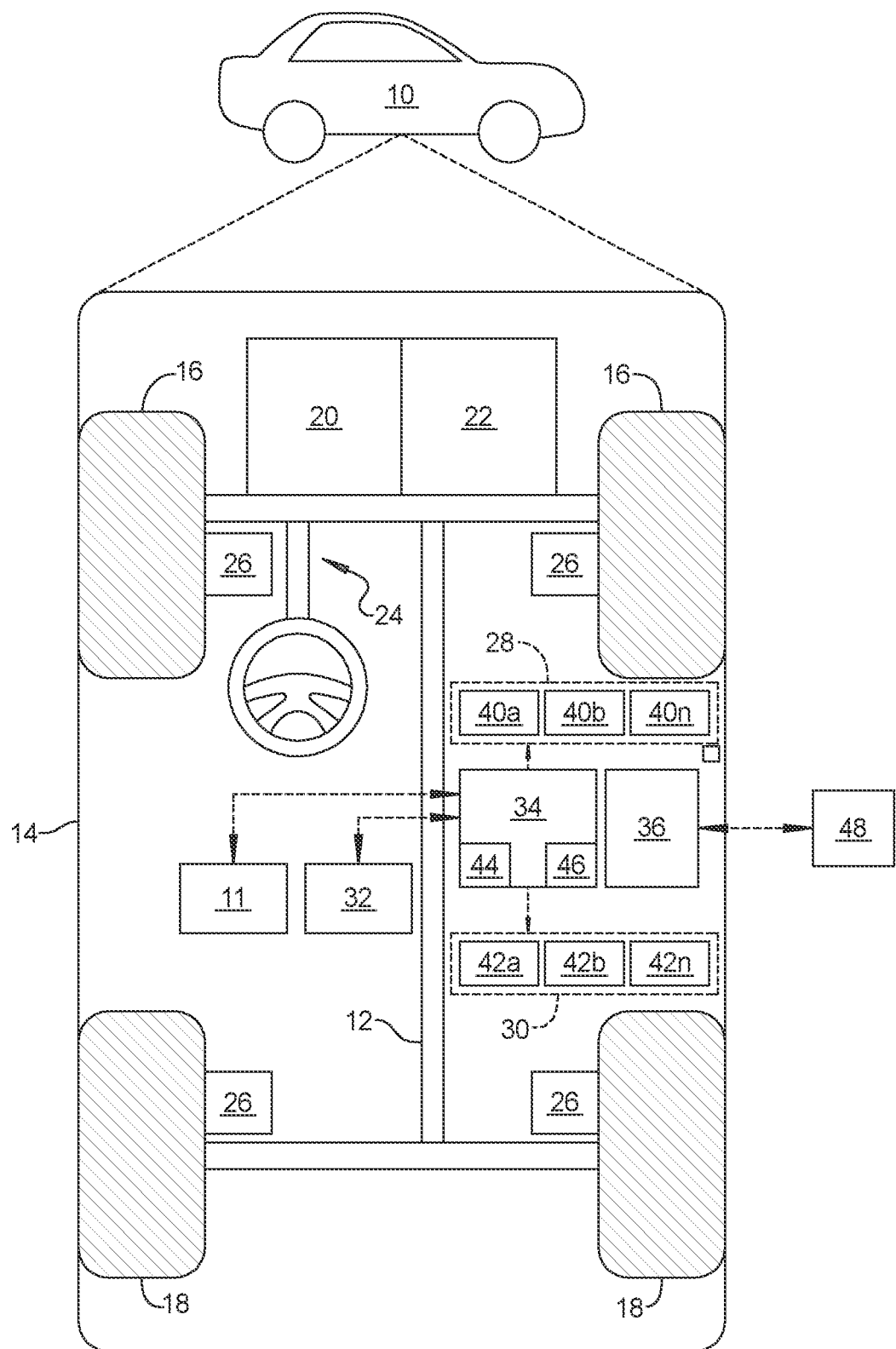
FIG. 1 is a schematic diagram of a vehicle having a system for providing a warning to an occupant of a hazardous object prior to the occupant exiting the vehicle according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for providing a warning to an occupant 56 with the vehicle 10 of hazardous objects 64 within an environment outside of the vehicle 10 prior to the occupant 56 exiting the vehicle 10 in accordance with various embodiments. In general, the system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
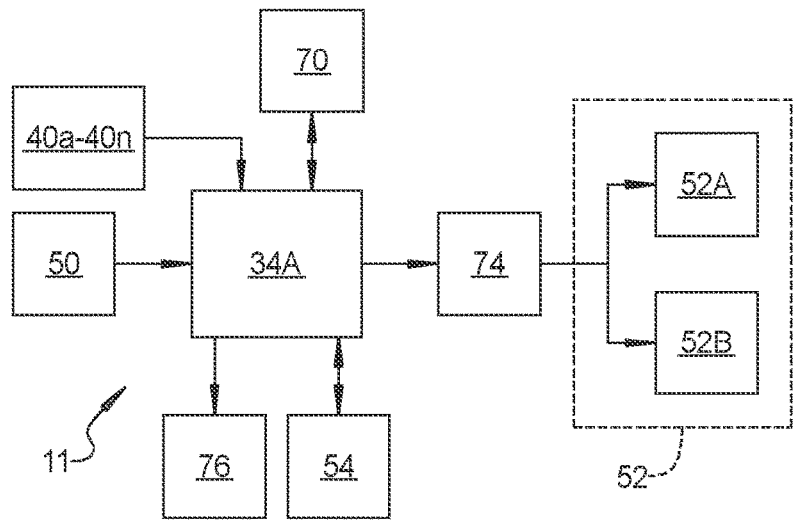
FIG. 2 is a schematic diagram of the system according to an exemplary embodiment.

Referring to FIG. 2 a schematic diagram of the system 11 is shown. The system 11 includes a system controller 34A in communication with the plurality of sensing devices (onboard sensors) 40a-40n. The system controller 34A may be the vehicle controller 34, or the system controller 34A may be a separate controller in communication with the vehicle controller 34. In addition to the plurality of onboard sensors 40a-40n, the system controller 34A is in communication with an occupant monitoring system 50 adapted to monitor and detect movement of the occupant within the vehicle, a display screen 52 adapted to be viewed by the occupant within the vehicle, and a database 54.

Figure 3:
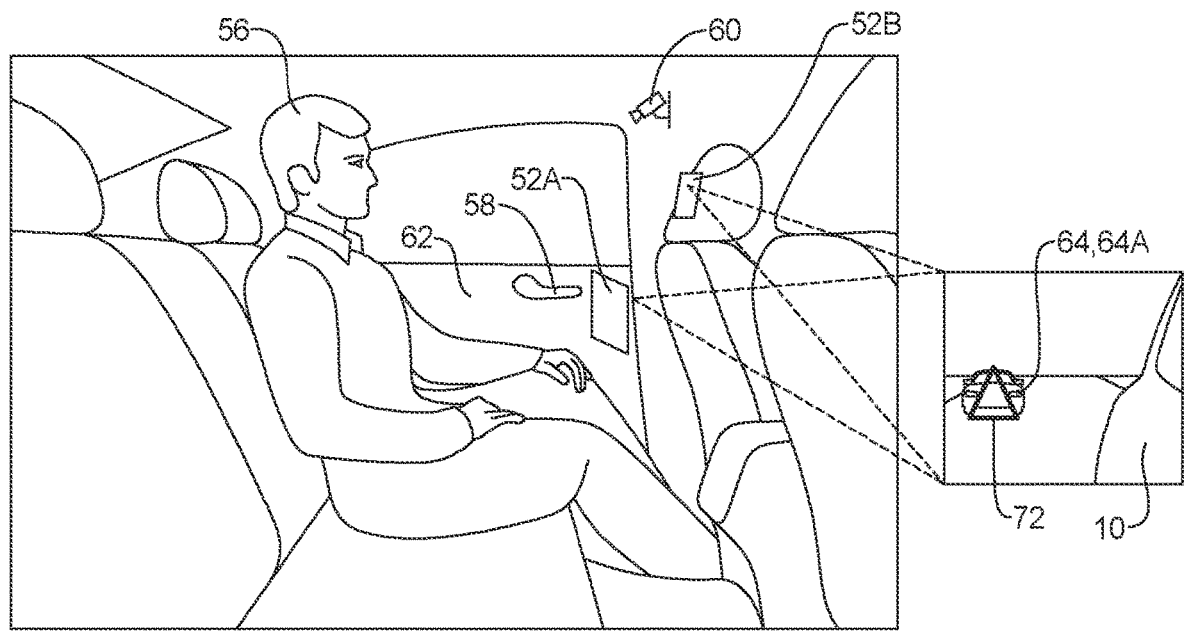
FIG. 3 is a schematic diagram of an interior of the vehicle with an occupant seated therein.

In an exemplary embodiment, the system controller 34A is adapted to detect when the occupant 56 within the vehicle 10 is about to exit the vehicle 10. The system controller 34A identifies conditions that indicate when the occupant 56 within the vehicle 10 is about to exit the vehicle 10. When making a determination of if the occupant 56 is about the exit the vehicle 10, the system controller 34A, via access to the plurality of onboard sensors 40a-40n and onboard vehicle systems determines if the vehicle 10 is at least one of stopped, parked and not-running. Referring to FIG. 3, in addition, the system controller 34A via communication with the occupant monitoring system 50 determines if the occupant 56 within the vehicle 10 is reaching for a door latch 58 within the vehicle 10. The occupant monitoring system 50 includes at least one camera 60 adapted to capture data (images) related to motion of the occupant 56 within the vehicle 10. Using image recognition techniques, the system controller 34A is adapted to identify when motions of the occupant 56 captured by the at least one camera 60 of the occupant monitoring system 50 indicate that the occupant 56 is reaching for the door latch 58 within the vehicle 10, thus indicating that the occupant 56 is about to exit the vehicle 10.

If the system controller 34A identifies that the vehicle 10 is stopped, parked, or the engine of the vehicle 10 is not running, or if the system controller 34A, via the occupant monitoring system 50 detects that the occupant 56 is reaching for the door latch 58 within the vehicle 10, the system controller 34A determines that the occupant 56 is about to exit the vehicle 10, and actuates the at least one external camera (of the plurality of onboard sensors 40a-40n) on the vehicle 10 and captures, with the at least one exterior camera, images of the environment outside the vehicle 10.

The system controller 34A, via communication with the plurality of onboard sensors 40a-40n, is adapted to identify the location of the occupant 56 within the vehicle 10, and to display, on the display screen 52, a view of the environment outside of the vehicle 10 collected by at least one of the plurality of sensors (the at least one external camera) 40a-40n. In an exemplary embodiment, the vehicle 10 includes a display screen 52 associated with each passenger location within the vehicle 10. More specifically, the vehicle 10 includes at least one display screen 52 for each passenger position within the vehicle 10 that is adjacent a door 62 of the vehicle 10, wherein any occupant 56 within the vehicle 10 that has access to a door 62 of the vehicle 10 can view images of the environment outside the vehicle 10 on a display screen 52 associated therewith.

Referring again to FIG. 3, when displaying a view of the environment outside of the vehicle 10 on the display screen 52, the system controller 34A is further adapted to at least one of display on a dedicated display screen 52A mounted onto the door 62 of the vehicle 10, the view of the environment outside the vehicle 10, and display on a display screen 52B of an onboard infotainment system, the view of the environment outside the vehicle 10. In an exemplary embodiment, the dedicated display screen 52A is mounted directly onto the door 62 adjacent the occupant 56 within the vehicle 10. The dedicated display screen 52A is mounted onto the door 62 in proximity to the door latch 58, such that, when the occupant 56 intends to exit the vehicle 10, the occupant 56 will naturally glance toward the dedicated display screen 52A when reaching for the door latch 58. In another exemplary embodiment, the system controller 34A displays the view of the environment outside the vehicle 10 on a display screen 52B of an onboard infotainment system. Such infotainment display screen 52B is positioned within the vehicle 10 at a location easily viewable by the occupant 56. As shown, the display screen 52B of the infotainment system is mounted within a headrest of a seat in front of the occupant 56. It should be understood that the infotainment display screen 52B may be of any known type and may be positioned at positions known in the industry for infotainment display screens. It should be further understood that the system controller 34A may display the view of the environment outside the vehicle 10 on either one or both of the dedicated display screen 52A on the door 62 and the display screen 52B of the infotainment system.

The system controller 34A is further adapted to determine if there is a hazardous object 64 within the environment outside of the vehicle 10. A hazardous object 64 is any object within a pre-determined distance of the vehicle 10 that may pose a threat during the occupant's 56 exit from the vehicle 10. A hazardous object 64 is any object that could collide with at least one of the door 62 of the vehicle 10 or the occupant 56 during the occupant's 56 exit from the vehicle 10, or an object (broken concrete, curb, pothole) or condition (ice, water, debris) that could cause the occupant 56 to trip, stubble or fall during the occupant's 56 exit from the vehicle 10.

In an exemplary embodiment, when determining if there is a hazardous object 64 within the environment outside of the vehicle 10 the system controller 34A is further adapted to detect at least one moving object 64A within the environment outside the vehicle 10. The system controller 34A, using computer vision and image recognition techniques applied to the images of the environment outside the vehicle 10 captured by the at least one external camera 40a-40n, identifies any moving objects 64A within a pre-determined distance of the vehicle 10. Such identified moving objects 64A may be other vehicles, pedestrians, a person on a bike, children playing nearby, or any other moving object 64A within the pre-determined distance. The pre-determined distance is a distance that is determined to be a distance within which a moving object 64A may pose a threat to an occupant 56 exiting the vehicle 10.

The system controller 34A further analyzes the speed, position, acceleration, trajectory and recent changes to any of the speed, position, acceleration and trajectory of each of the at least one moving object 64A relative to the vehicle 10. Thus, the system controller 34A can identify which, if any of the at least one moving objects 64A are moving toward the vehicle 10, away from the vehicle 10, are moving erratically, are moving at a high rate of speed, etc., to determine if the at least one moving object 64A could collide with at least one of the door 62 of the vehicle 10 or the occupant 56 during the occupant's 56 exit from the vehicle 10, and thus, is a hazardous object 64.

In another exemplary embodiment, when determining if there is a hazardous object 64 within the environment outside of the vehicle 10 the system controller 34A is further adapted to detect at least one stepping hazard 64B within the environment outside the vehicle 10. A stepping hazard 64B is any object (broken concrete, curb, pothole) or condition (ice, water, debris) that could cause the occupant 56 to trip, stubble or fall during the occupant's 56 exit from the vehicle 10.

In an exemplary embodiment, when determining if there is a hazardous object 64 within the environment outside of the vehicle 10 the system controller 34A is further adapted to determine a probability that the at least one moving object 64A will collide with at least one of the door 62 of the vehicle 10 and the occupant 56 during the occupant's 56 exit from the vehicle 10 and to determine a probability that the at least one stepping hazard 64B will cause the occupant 56 to trip, stumble or fall during the occupant's 56 exit from the vehicle 10. If the probability that the at least one moving object 64A will collide with at least one of the door 62 of the vehicle 10 and the occupant 56 during the occupant's 56 exit from the vehicle 10 exceeds a pre-determined threshold, then the at least one moving object 64A is classified as a hazardous object 64. Likewise, if the probability that the at least one stepping hazard 64B will cause the occupant 56 to trip, stumble or fall during the occupant's 56 exit from the vehicle 10 exceeds the pre-determined threshold, then the at least one stepping hazard 64B is classified as a hazardous object 64.

For example, referring again to FIG. 3, within the image captured of the environment outside the vehicle 10, the system controller 34A, using computer vision and image recognition techniques, identifies a moving object 64A, here a car, that is approaching the vehicle 10 on the side where the occupant 56 plans to exit the vehicle 10. After analyzing the speed and trajectory of the identified moving object (car) 64A, the system controller 34A determines that there is a 60% chance that the moving object (car) 64A will collide with either the vehicle door 62 or the occupant 56 if the occupant 56 were to proceed with exiting the vehicle 10. The pre-determined threshold may be pre-set at, for example, 50%. Thus, the probability that the moving object (car) 64A will collide with either the vehicle door 62 or the occupant 56 if the occupant 56 were to proceed with exiting the vehicle 10 exceeds the pre-determined threshold of 50%, and the moving object (car) 64A is classified as a hazardous object 64.

In an exemplary embodiment, when determining a probability that the at least one moving object 64A will collide with at least one of the door 62 of the vehicle 10 and the occupant 56 during the occupant's 56 exit from the vehicle 10, and when determining a probability that the at least one stepping hazard 64B will cause the occupant 56 to at least one of trip, stumble and fall the system controller 34A is further adapted to probabilistically calculate, with a machine learning algorithm 70, a probability that the at least one moving object 64A will collide with at least one of the door 62 of the vehicle 10 and the occupant 56 during the occupant's 56 exit from the vehicle 10, and a probability that the at least one stepping hazard 64B will cause the occupant 56 to at least one of trip, stumble and fall during the occupant's 56 exit from the vehicle 10.

The database 54 in communication with the system controller 34A is adapted to store data related to past occurrences of identifying hazardous objects 64 by the system controller 34A as well as environmental aspects (weather, temperature, precipitation) and vehicle aspects (location, parked, stopped, engine off) during such past occurrences.

The machine learning algorithm 70 is adapted to predict a probability that the at least one moving object 64A will collide with at least one of the door 62 of the vehicle 10 and the occupant 56 during the occupant's 56 exit from the vehicle 10, and a probability that the at least one stepping hazard 64B will cause the occupant 56 to at least one of trip, stumble and fall during the occupant's 56 exit from the vehicle 10 based on real-time data collected by the plurality of onboard sensors 40a-40n, analysis of captured images using computer vision and image recognition techniques and data from past occurrences from the database 54.

Various techniques are employed to extract meaningful features from sensor readings and data, including time-series analysis, frequency-domain analysis, and spatial-temporal patterns. The machine learning algorithm 70 may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN). The machine learning algorithm 70 is trained with data collected from a plurality of different vehicles. A diverse dataset is collected from vehicles equipped with sensors such as GPS, accelerometers, cameras, radar, and LIDAR. The data encompasses various driving scenarios, including urban, highway, and off-road driving. Before feeding the data into machine learning models, preprocessing steps are undertaken to remove noise, handle missing values, and standardize features. An essential step in driving behavior classification is the extraction of relevant features from the raw data. As mentioned above, various techniques are employed to extract meaningful features from sensor readings, including time-series analysis, frequency-domain analysis, and spatial-temporal patterns. Different types of machine learning algorithms may be used for probabilistic identification of hazardous objects. The machine learning algorithm 70 is trained on a labeled dataset and evaluated using various performance metrics such as accuracy, precision, recall, F1-score, and confusion matrix. The hyperparameters of the models are tuned to achieve optimal results. The machine learning algorithm 70 is further trained on training data and will learn to map input features to the corresponding probabilities.

Data from occurrences of the system controller 34A identifying and classifying hazardous objects 64 within the vehicle 10 is saved to the database 54 and is used to continuously update the machine learning algorithm 70. Thus, the system controller 34A uses the machine learning algorithm 70 and machine learning techniques to predict a probability that the at least one moving object 64A will collide with at least one of the door 62 of the vehicle 10 and the occupant 56 during the occupant's 56 exit from the vehicle 10 and to determine a probability that the at least one stepping hazard 64B will cause the occupant 56 to trip, stumble or fall during the occupant's 56 exit from the vehicle 10, based on analyzing the real-time data collected by the plurality of onboard sensors 40a-40n, analysis of captured images using computer vision and image recognition techniques and data from past occurrences from the database 54.

Figure 4:
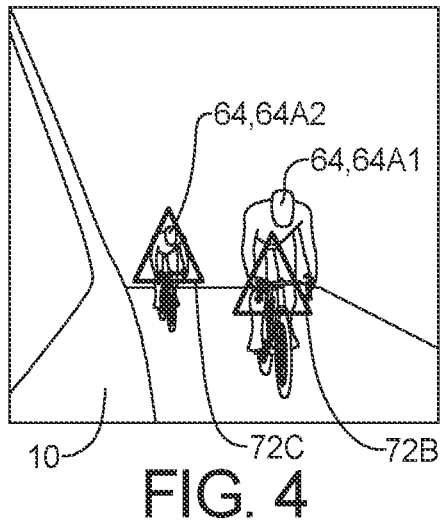
FIG. 4 is an image being displayed on a display screen including two bikers approaching the vehicle.

When the system controller 34A identifies a hazardous object 64 within the environment outside the vehicle 10, the system controller 34A further classifies the hazardous object 64 and determines a level of vulnerability/severity of the hazardous object 64. For example, referring again to FIG. 3, the system controller 34A identifies a hazardous object 64, here the moving object (car) 64A. Using computer vision and image recognition techniques, the system controller 34A identifies the moving object (car) 64A as a vehicle. Based on the identification of the moving object 64A, a vehicle, and other aspects, such as the speed and trajectory of the vehicle, the system controller 34A will determine a relative danger posed by the moving object (car) 64A. Referring to FIG. 4, the system controller 34A identifies two hazardous objects 64, here a first bike rider 64A1 and a second bike rider 64A2. Using computer vision and image recognition techniques, the system controller 34A identifies the moving objects 64A1, 64A2 as a person riding a bike. Based on the identification of the objects 64A1, 64A2 and other aspects, such as the speed and trajectory of the bikes, the system controller 34A will determine a relative danger posed by the first and second bike riders 64A1, 64A2. In this example, the severity of the potential danger posed by the vehicle 64A is much greater than the severity of the potential danger posed by the bikes 64A1, 64A2. Such determination of the relative severity is used when determining appropriate augmentation to be provided within the displayed image of the environment outside the vehicle 10, as discussed below.

When a hazardous object 64 is identified within the environment outside the vehicle 10 by the system controller 34A, the system controller 34A is further adapted to provide augmented reality alerts 72 within the display screen 52. The augmented reality alerts 72 are adapted to draw the occupant's 56 attention to the hazardous object 64 so the occupant 56 can make a determination of proceeding with exiting the vehicle 10, or waiting until the hazardous object 64 has passed.

Figure 5:
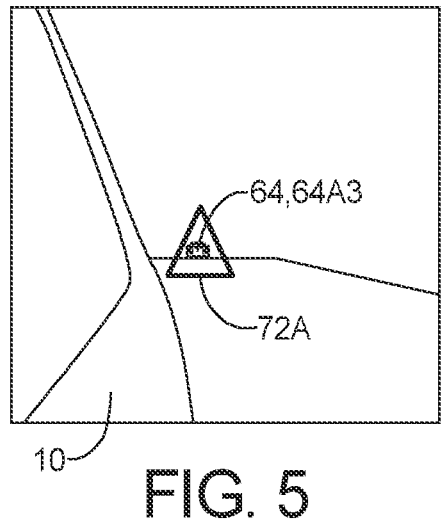
FIG. 5 is an image being displayed on a display screen including a moving object that is a car.

Referring again to FIG. 3, the system controller 34A overlays an augmented reality alert 72 on the image shown on the display 52. As shown, the augmented reality alert 72 comprises a graphic, here a caution triangle icon, overlayed onto the moving object (car) 64A. The augmented reality alert 72 may be color coded based on the relative severity level of the hazardous object 64, as discussed above. For example, the moving object (car) 64A in FIG. 3 poses a relatively severe potential danger, so the augmented reality alert 72 (graphic of caution triangle) is displayed in red. Alternatively, referring to FIG. 5, a moving object (car) 64A3 is identified as a hazardous object, but based on the distance from the vehicle 10, the moving object (car) 64A3 in FIG. 5 poses less relative danger, so the augmented reality alert 72A (graphic of caution triangle) is displayed in yellow.

In another example, referring again to FIG. 4, two people riding bikes 64A1, 64A2 are identified as hazardous objects 64 in the image of the environment outside the vehicle 10. Due to proximity to the vehicle 10, speed and/or behavior, the first bike rider 64A1 is identified as a hazardous object 64 that poses a higher relative danger than the second bike rider 64A2. This may be based entirely on the proximity to the vehicle 10 (second bike rider 64A2 is further away), or may be based on the riding behavior of the first and second bike riders 64A1, 64A2 (first bike rider 64A1 is moving fast and erratically, second bike rider 64A2 is moving slow and steady), or may be a combination of both, resulting in the system controller 34A overlaying an augmented reality alert 72B (caution triangle icon) onto the image displayed over the first bike rider 64A1 that is red, and overlaying an augmented reality alert 72C (caution triangle icon) onto the image displayed over the second bike rider 64A2 that is yellow.

In another exemplary embodiment, referring again to FIG. 4, even though both the first bike rider 64A1 and the second bike rider 64A2 have a probability of colliding with either one of the door 62 of the vehicle 10 or the occupant 56 as the occupant 56 exits the vehicle 10 that exceeds the pre-determined threshold, the displayed augmented reality alerts 72B, 72C may be tailored based on the calculated probabilities. For example, the machine learning algorithm 70 calculated the probability that the first bike rider 64A1 will collide with one of the door 62 of the vehicle 10 or the occupant 56 as the occupant 56 exits the vehicle 10 as 90%, and calculated the probability that the second bike rider 64A2 will collide with one of the door 62 of the vehicle 10 or the occupant 56 as the occupant 56 exits the vehicle 10 as 60%. Based on the relative calculated probabilities, the system controller 34A overlays an augmented reality alert 72B (caution triangle icon) onto the image displayed over the first bike rider 64A1 that is red, and overlays an augmented reality alert 72C (caution triangle icon) onto the image displayed over the second bike rider 64A2 that is yellow.

Figure 6:
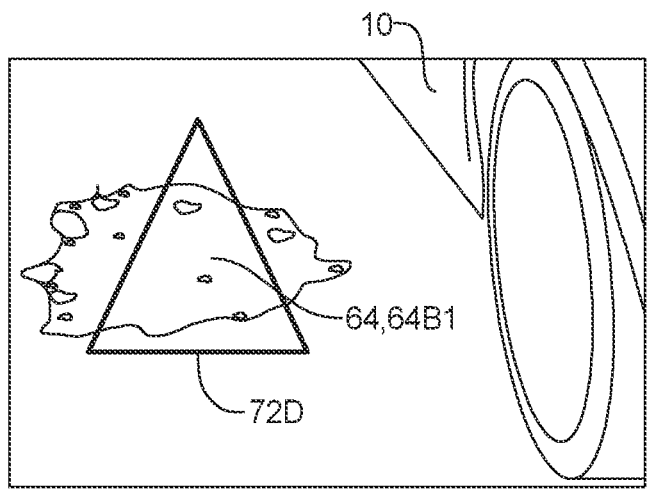
FIG. 6 is an image being displayed on a display screen including a stepping hazard that is a pothole next to the vehicle.
Figure 7:
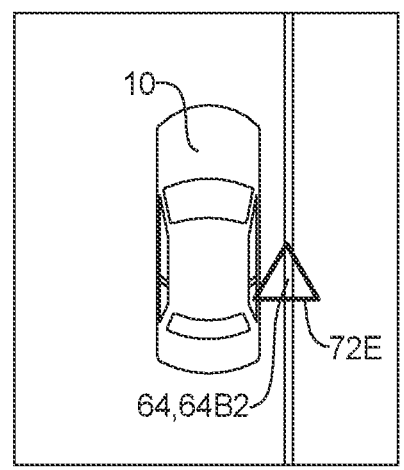
FIG. 7 is an image being displayed on a display screen including a stepping hazard that is a curb adjacent the vehicle.

In another example, referring to FIG. 6, the system controller 34A identifies a stepping hazard 64B that comprises a pothole 64B1 next to the vehicle 10 that may cause a tripping hazard for the occupant 56 as the occupant 56 exits the vehicle 10. Due to proximity to the vehicle 10, the system controller 34A overlays an augmented reality alert 72D (caution triangle icon) onto the image displayed over the pothole 64B1 to draw the occupant's 56 attention to the pothole 64B1. The system controller 34A may use an exterior camera mounted onto the side of the vehicle 10, to obtain the view shown in FIG. 6, or may use a plurality of cameras to provide a top-down view of the vehicle 10, including an identified hazardous object 64 comprising a curb 64B2 adjacent the vehicle 10 with an augmented reality alert 72E, as shown in FIG. 7.

The system includes a graphical processor 74 in communication with the system controller 34A. The graphical processor 74 processes information from the system controller 34A and determines an appropriate augmented reality alert graphic 72 to overlay onto the image displayed for the occupant 56.

In an exemplary embodiment, the system controller 34A is further adapted to determine if the door 62 of the vehicle 10 has been opened, and, when the door 62 has been opened, to determine if additional alerts 76 are necessary. For example, if the system controller 34A displays and image on the display, and provided an augmented reality alert 72 to draw the attention of the occupant 56 to a hazardous object 64, but the system controller 34A detects, that despite the augmented reality alert 72, the occupant 56 has proceeded with opening the door 72, the system controller 34A will verify that the hazardous object 64 is still present, and if the hazardous object 64 is still present, initiates additional alerts 76.

Additional alerts 76 may include audible chimes, haptic alerts (vibrating seats), or lighting alerts. Such additional alerts 76 may be alerts that are already present within the vehicle 10 and adapted to provide alerts to an occupant 56, wherein the augmented reality alerts 72 provided in the display 52 of the present disclosure are provided prior to such additional alerts 76 to give an occupant 56 the opportunity to delay exiting the vehicle 10. The additional alerts 76 are adapted to provide further alerts to the occupant 56 that proceeding with exiting the vehicle 10 may be hazardous.

Figure 8:
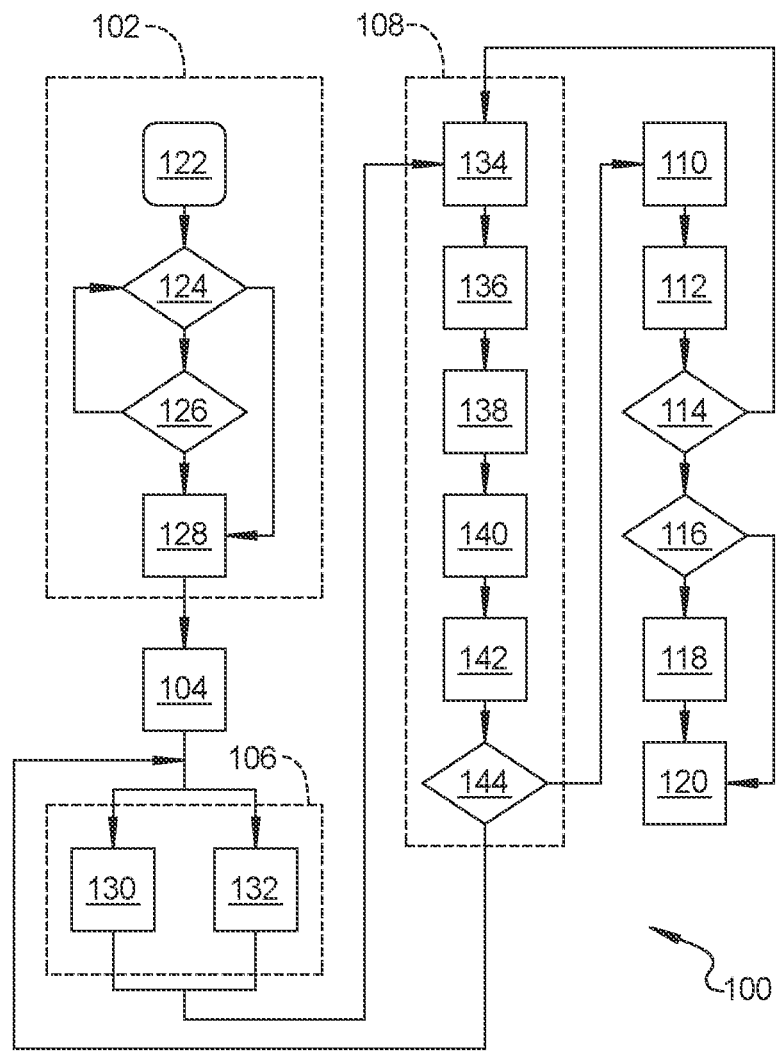
FIG. 8 is a flow chart illustrating a method of providing a warning to an occupant within a vehicle prior to the occupant exiting the vehicle according to an exemplary embodiment.

Referring to FIG. 8, a method 100 of providing warning to an occupant 56 within a vehicle 10 prior to the occupant 56 exiting the vehicle 10 includes, beginning at block 102, detecting, with a system controller 34A in communication with a plurality of onboard sensors 40a-40n and an occupant monitoring system 50, when an occupant 56 within the vehicle 10 is about to exit the vehicle 10, moving to block 104, detecting, with the system controller 34A, a position of the occupant 56 within the vehicle 10, moving to block 106, displaying, with the system controller 34A, on a display screen 52 adapted to be viewed by the occupant 56, a view of an environment outside of the vehicle 10, moving to block 108, determining, with the system controller 34A, if there is a hazardous object 64 within the environment outside of the vehicle 10, and, when there is a hazardous object 64 within the environment outside the vehicle 10, moving to block 110, classifying the hazardous object 64, and, moving to block 112, providing augmented reality alerts 72 within the display screen 52.

In an exemplary embodiment, the method 100 further includes, moving to block 114, determining, with the system controller 34A, if a door 62 of the vehicle 10 has been opened. When the door 62 has not been opened, then, moving to block 108, the method reverts to detecting if there is a hazardous object 64. When the door 62 has been opened, then, moving to block 116, the method 100 includes determining, with the system controller 34A if additional alerts 76 are necessary. If additional alerts 76 are necessary, then, moving to block 118, the method 100 includes initiating, with the system controller 34A, the additional alerts 76, and, moving to block 120, terminating the method 100. If, at block 116, additional alerts are not necessary, then, moving to block 120, the method 100 includes terminating the method 100.

In an exemplary embodiment, the detecting, with the system controller 34A in communication with the plurality of onboard sensors 40a-40n and the occupant monitoring system 50, when the occupant 56 within the vehicle 10 is about to exit the vehicle 10 at block 102 further includes, beginning at block 122, the occupant 56 rides within the vehicle 10, moving to block 124, determining, with the system controller 34A, if the vehicle 10 is at least one of: stopped, parked and not-running, and, moving to block 126, determining, with the system controller 34A, via the occupant monitoring system 50, if the occupant 56 is reaching for a door latch 58 within the vehicle 10, and, moving to block 128, actuating, with the system controller 34A, external cameras 40a-40n on the vehicle 10 and capturing, with the external cameras 40a-40n, images of the environment outside the vehicle 10 when at least one of: the vehicle 10 is at least one of stopped, parked and not-running, and the occupant 56 is reaching for the door latch 58 within the vehicle 10.

In an exemplary embodiment, the displaying, with the system controller 34A, on a display screen 52 adapted to be viewed by the occupant 56, a view of an environment outside of the vehicle 10 further includes at least one of, moving to block 130, displaying, with the system controller 34A, on a dedicated display screen 52A mounted onto the door 62 of the vehicle 10, the view of the environment outside the vehicle 10, and, moving to block 132, displaying, with the system controller 34A, on a display screen 52B of an onboard infotainment system, the view of the environment outside the vehicle 10.

In an exemplary embodiment, the determining, with the system controller 34A, if there is a hazardous object 64 within the environment outside of the vehicle 10 at block 108 further includes, moving to block 134, detecting, with the system controller 34A and the plurality of onboard sensors 40a-40n, at least one moving object 64A within the environment outside the vehicle 10.

In still another exemplary embodiment, the detecting, with the system controller 34A and the plurality of onboard sensors 40a-40n, at least one moving object 64A within the environment outside the vehicle 10 further includes, moving to block 136, analyzing the speed, position, acceleration, trajectory and recent changes to any of the speed, position, acceleration and trajectory of the at least one moving object 64A relative to the vehicle 10.

In another exemplary embodiment, the determining, with the system controller 34A, if there is a hazardous object 64 within the environment outside of the vehicle 10 at block 108 further includes, moving to block 138, detecting, with the system controller 34A and the plurality of onboard sensors 40a-40n, at least one stepping hazard 64B within the environment outside the vehicle 10.

In another exemplary embodiment, the determining, with the system controller 34A, if there is a hazardous object 64 within the environment outside of the vehicle 10 at block 108 further includes, moving to block 140, determining, with the system controller 34A, a probability that the at least one moving object 64A will collide with at least one of the door 62 of the vehicle 10 and the occupant 56 during the occupant's 56 exit from the vehicle 10, and determining, with the system controller 34A, a probability that the at least one stepping hazard 64B will cause the occupant 56 to at least one of trip, stumble and fall during the occupant's 56 exit from the vehicle 10.

In yet another exemplary embodiment, the determining, with the system controller 34A, a probability that the at least one moving object 64A will collide with at least one of the door 62 of the vehicle 10 and the occupant 56 during the occupant's 56 exit from the vehicle 10, and the determining, with the system controller 34A, a probability that the at least one stepping hazard 64B will cause the occupant 56 to at least one of trip, stumble and fall at block 140 further includes, moving to block 142, probabilistically calculating, with a machine learning algorithm 70, a probability that the at least one moving object 64A will collide with at least one of the door 62 of the vehicle 10 and the occupant 56 during the occupant's 56 exit from the vehicle 10, and a probability that the at least one stepping hazard 64B will cause the occupant 56 to at least one of trip, stumble and fall during the occupant's 56 exit from the vehicle 10, and, moving to block 144, the method 100 proceeds to classifying the hazardous object 64, at block 110, when a hazardous object is identified, and, the method 100 reverts back to displaying, with the system controller 34A, on the display screen 52 adapted to be viewed by the occupant 56, a view of an environment outside of the vehicle 10, at block 106, when no hazardous object 64 is identified.

A system and method of the present disclosure offers the advantage of providing a warning to an occupant within a vehicle to the presence of a hazardous object prior to the occupant exiting the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of providing warning to an occupant within a vehicle prior to the occupant exiting the vehicle, comprising:
    detecting, with a system controller in communication with a plurality of onboard sensors and an occupant monitoring system, when an occupant within the vehicle is about to exit the vehicle by:
        determining, with the system controller, if the vehicle is at least one of: stopped, parked and not-running;
        determining, with the system controller, via the occupant monitoring system, if the occupant is reaching for a door latch within the vehicle; and
        actuating, with the system controller, external cameras on the vehicle and capturing, with the external cameras, images of the environment outside the vehicle when at least one of:
            the vehicle is at least one of stopped, parked and not-running; and
            the occupant is reaching for the door latch within the vehicle;
    detecting, with the system controller, a position of the occupant within the vehicle;
    capturing, with the system controller and the plurality of onboard sensors, images of an environment outside the vehicle;
    displaying, with the system controller, on a display screen adapted to be viewed by the occupant, a view of the environment outside of the vehicle, including at least one of:
        displaying, with the system controller, on a dedicated display screen mounted onto the door of the vehicle, the view of the environment outside the vehicle; and
        displaying, with the system controller, on a display screen of an onboard infotainment system, the view of the environment outside the vehicle;
    detecting, with the system controller, and the plurality of onboard sensors, at least one moving object and at least one stepping hazard within the environment outside the vehicle based on real-time data collected by the plurality of onboard sensors, analysis of captured images of the environment outside the vehicle using computer vision and image recognition techniques and data from past occurrences of identifying hazardous objects stored within a database in communication with the system controller, analyzing the speed, position, acceleration, trajectory and recent changes to any of the speed, position, acceleration and trajectory of the at least one moving object relative to the vehicle;
    determining, with the system controller, a probability that the at least one moving object will collide with at least one of the door of the vehicle and the occupant during the occupant's exit from the vehicle by probabilistically calculating, with a machine learning algorithm, a probability that the at least one moving object will collide with at least one of the door of the vehicle and the occupant during the occupant's exit from the vehicle based on real-time data collected by the plurality of onboard sensors, analysis of captured images of the environment outside the vehicle using computer vision and image recognition techniques and data from past occurrences of identifying and classifying hazardous objects stored within the database;
    determining, with the system controller, a probability that the at least one stepping hazard will cause the occupant to at least one of trip, stumble and fall during the occupant's exit from the vehicle by probabilistically calculating, with a machine learning algorithm, a probability that the at least one stepping hazard will cause the occupant to at least one of trip, stumble and fall during the occupant's exit from the vehicle based on real-time data collected by the plurality of onboard sensors, analysis of captured images of the environment outside the vehicle using computer vision and image recognition techniques and data from past occurrences of identifying and classifying hazardous objects stored within the database; and when there is a hazardous object within the environment outside the vehicle:
classifying the hazardous object by determining a relative severity of the hazardous object;
providing augmented reality alerts overlayed onto the hazardous object within the display screen including one of:
displaying an augmented reality alert overlayed onto a single hazardous object that is color coded based on the relative severity of the single hazardous object; and
displaying an augmented reality alert overlayed onto each one of a plurality of hazardous objects, each augmented reality alert color coded based on the relative severity of the one of the plurality of hazardous objects onto which the augmented reality alert is overlayed;
determining, with the system controller, if a door of the vehicle has been opened;
when the vehicle door has been opened, determining, with the system controller if additional alerts are necessary; and
if additional alerts are necessary, initiating, with the system controller, additional alerts.

2. A vehicle having a system for providing warning to an occupant within the vehicle prior to the occupant exiting the vehicle, comprising:
a plurality of onboard sensors adapted to collect information related to an environment outside the vehicle;
an occupant monitoring system adapted to monitor and detect movement of the occupant within the vehicle;
a display screen adapted to be viewed by the occupant within the vehicle;
a system controller in communication with the plurality of onboard sensors, the occupant monitoring system and the display screen, the system controller adapted to:
determine if the vehicle is at least one of: stopped, parked and not-running;
determine, via the occupant monitoring system, if the occupant is reaching for a door latch within the vehicle; and
actuate external cameras on the vehicle and capturing, with the external cameras, images of the environment outside the vehicle when at least one of:
the vehicle is at least one of stopped, parked and not-running, and
the occupant is reaching for the door latch within the vehicle;
detect a position of the occupant within the vehicle;
at least one of:
display on a dedicated display screen mounted onto the door of the vehicle, the view of the environment outside the vehicle; and
display on a display screen of an onboard infotainment system, the view of the environment outside the vehicle;
detect at least one moving object within the environment outside the vehicle;
analyze the speed, position, acceleration, trajectory and recent changes to any of the speed, position, acceleration and trajectory of the at least one moving object relative to the vehicle;
detect at least one stepping hazard within the environment outside the vehicle;
probabilistically calculate, with a machine learning algorithm, a probability that the at least one moving object will collide with at least one of the door of the vehicle and the occupant during the occupant's exit from the vehicle based on real-time data collected by the plurality of onboard sensors, analysis of captured images of the environment outside the vehicle using computer vision and image recognition techniques and data from past occurrences of identifying hazardous objects stored within a database in communication with the system controller, and when the probability exceeds a pre-determined threshold, classify the at least one moving object as a hazardous object;
probabilistically calculate, with the machine learning algorithm, a probability that the at least one stepping hazard will cause the occupant to at least one of trip, stumble and fall during the occupant's exit from the vehicle based on real-time data collected by the plurality of onboard sensors, analysis of captured images of the environment outside the vehicle using computer vision and image recognition techniques and data from past occurrences of identifying hazardous objects stored within the database in communication with the system controller, and when the probability exceeds the pre-determined threshold, classify the at least one stepping hazard as a hazardous object; and
when there is a hazardous object within the environment outside the vehicle:
classify the hazardous object by determining a relative severity of the hazardous object;
provide augmented reality alerts overlayed onto the hazardous object within the display screen;
determine if a door of the vehicle has been opened; and
when the vehicle door has been opened, determine if additional alerts are necessary, and, when additional alerts are necessary, initiate additional alerts.

3. A system for providing warning to an occupant within a vehicle prior to the occupant exiting the vehicle, comprising:
a plurality of onboard sensors adapted to collect information related to an environment outside the vehicle;
an occupant monitoring system adapted to monitor and detect movement of the occupant within the vehicle;
a display screen adapted to be viewed by the occupant within the vehicle;
a system controller in communication with the plurality of onboard sensors, the occupant monitoring system and the display screen, the system controller adapted to:
determine if the vehicle is at least one of: stopped, parked and not-running;
determine, via the occupant monitoring system, if the occupant is reaching for a door latch within the vehicle; and actuate external cameras on the vehicle and capturing, with the external cameras, images of the environment outside the vehicle when at least one of:
  the vehicle is at least one of stopped, parked and not-running, and
  the occupant is reaching for the door latch within the vehicle;
detect a position of the occupant within the vehicle;
at least one of:
  display on a dedicated display screen mounted onto the door of the vehicle, the view of the environment outside the vehicle; and
  display on a display screen of an onboard infotainment system, the view of the environment outside the vehicle;
detect at least one moving object within the environment outside the vehicle;
analyze the speed, position, acceleration, trajectory and recent changes to any of the speed, position, acceleration and trajectory of the at least one moving object relative to the vehicle;
detect at least one stepping hazard within the environment outside the vehicle;
probabilistically calculate, with a machine learning algorithm, a probability that the at least one moving object will collide with at least one of the door of the vehicle and the occupant during the occupant's exit from the vehicle based on real-time data collected by the plurality of onboard sensors, analysis of captured images of the environment outside the vehicle using computer vision and image recognition techniques and data from past occurrences of identifying hazardous objects stored within a database in communication with the system controller, and when the probability exceeds a pre-determined threshold, classify the at least one moving object as a hazardous object;
probabilistically calculate, with the machine learning algorithm, a probability that the at least one stepping hazard will cause the occupant to at least one of trip, stumble and fall during the occupant's exit from the vehicle based on real-time data collected by the plurality of onboard sensors, analysis of captured images of the environment outside the vehicle using computer vision and image recognition techniques and data from past occurrences of identifying hazardous objects stored within the database in communication with the system controller, and when the probability exceeds the pre-determined threshold, classify the at least one stepping hazard as a hazardous object; and
when there is a hazardous object within the environment outside the vehicle:
  classify the hazardous object by determining a relative severity of the hazardous object;
  provide augmented reality alerts overlayed onto the hazardous object within the display screen;
  determine if a door of the vehicle has been opened; and
  when the vehicle door has been opened, determine if additional alerts are necessary, and, when additional alerts are necessary, initiate additional alerts.

* * * * *